United States Patent [19]
Alsenz

[11] Patent Number: 5,497,635
[45] Date of Patent: Mar. 12, 1996

[54] REFRIGERATION SYSTEM UTILIZING AN ENTHALPY EXPANSION JET COMPRESSOR

[76] Inventor: Richard H. Alsenz, 2402 Creek Meadows, Missouri City, Tex. 77459

[21] Appl. No.: 309,963

[22] Filed: Sep. 20, 1994

Related U.S. Application Data

[60] Division of Ser. No. 919,043, Jul. 23, 1992, Pat. No. 5,347,823, which is a continuation-in-part of Ser. No. 665,028, Mar. 6, 1991, abandoned, which is a continuation-in-part of Ser. No. 505,557, Apr. 6, 1990, Pat. No. 5,115,644.

[51] Int. Cl.$^6$ .................... F25B 1/00; F01D 1/18
[52] U.S. Cl. .................. 62/502; 62/116; 415/80; 417/406
[58] Field of Search .............. 62/87, 116, 50.3, 62/502; 415/80; 417/406

[56] References Cited

U.S. PATENT DOCUMENTS

| | | | |
|---|---|---|---|
| 3,864,065 | 2/1975 | Goldsberry | 415/80 X |
| 4,336,039 | 6/1982 | Sohre | 415/80 X |
| 4,336,693 | 6/1982 | Hays et al. | 62/115 |

Primary Examiner—William E. Wayner
Attorney, Agent, or Firm—Paul S. Madan

[57] ABSTRACT

A closed loop vapor cycle refrigeration system an expander-compressor is disclosed. A portion of the liquid refrigerant in the system is expanded into gas. This gas is used to operate a compressor. The compressor compresses the low pressure gas from the evaporator and discharges the compressed gas either to a primary compressor or the condenser. A novel expander-compressor device is also disclosed for use in the refrigeration system.

22 Claims, 5 Drawing Sheets

REFRIGERATION SYSTEM UTILIZING AN ENTHALPY EXPANSION JET COMPRESSOR

CROSS-REFERENCE TO RELATED APPLICATIONS

This application is a divisional application of U.S. patent application Ser. No. 07/919,043, filed Jul. 23, 1992, now U.S. Pat. No. 5,347,823 which is a continuation-in-part of copending U.S. patent application Ser. No. 07/665,028, filed Mar. 6, 1991, abandoned, which is a continuation-in-part of U.S. patent application Ser. No. 505,557, filed Apr. 6, 1990, now U.S. Pat. No. 5,115,644.

BACKGROUND OF THE INVENTION

1. Field of the Invention

This invention relates generally to a closed loop vapor cycle refrigeration system, and more particularly to a refrigeration system utilizing an engine-compressor device that is driven by high pressure gas in the refrigeration system.

2. Description of the Related Art

Devices such as expansion engines have been used in vapor cycle refrigeration systems in an effort to improve the overall efficiency of such systems. For example, each of the U.S. Pat. Nos. 3,934,424, 4,170,116, 4,086,772, 4,094,169 and 4,208,885 teaches the use of an expansion device in a vapor cycle to improve the overall efficiency of the refrigeration system. However, such devices have failed to significantly improve overall efficiency of refrigeration systems because those systems do not either properly control the flow of the refrigerant through the evaporator or that such expansion devices are not efficient or the combination of both. Therefore, such prior art refrigeration systems have failed to gain commercial acceptance. Also, the art, in general has taught against the use of devices, such as expansion engines in refrigeration systems. For example, David Mooney in the textbook, Mechanical Engineering, states that "in actual cases, after allowing for the irreversibility of the real engine process, the gain by use of the expansion engine is usually negligible and such machines are not used in modem vapor refrigeration plants."

In a closed loop refrigeration system, a small amount of potential energy is stored in the pressure difference of the refrigerant between the high pressure side and the low pressure side. Energy is wasted when this potential energy is changed into kinetic energy in the expansion valve of the refrigeration system. Also, a larger amount of energy is stored in the liquid refrigerant temperature on the high pressure side, which is changed into kinetic energy of the molecules when the liquid refrigerant boils in the evaporator. The prior art refrigeration systems attempt to improve the efficiency by utilizing this kinetic energy to drive or operate an expansion engine, which in turn is used to perform some useful function. However, as noted above, these prior art systems do not overcome the energy waste because these system either do not properly control the expansion throttling process or the flow of the refrigerant through the evaporator or that these devices themselves are not efficient.

The use of an expansion device, such as an expansion engine, as taught in prior art systems produces an inherent conflict, which can be understood by considering the following two extremes of the flow of the refrigerant through the evaporator.

In the one extreme, if the refrigerant leaving the expansion engine is completely vaporized, there will be little refrigeration accomplished by the system.

In the other extreme, if liquid refrigerant is allowed to enter the compressors, unnecessary load will be placed on the expansion engine causing a loss of efficiency or mechanical failure.

The present invention provides refrigeration systems wherein the engine of the engine-compressor device coupled to the evaporator of system is driven by high pressure gas in the system. The engine in turn drives the compressor, which compresses the low pressure gas refrigerant from the evaporator. A novel and efficient enthalpy-expansion-jet-compressor for use in refrigeration systems is also disclosed. For convenience, the enthalpy-expansion-jet-compressor is referred to hereinafter simply as the jet compressor.

SUMMARY OF THE INVENTION

In one embodiment, the present invention provides a closed loop refrigeration system that includes a condenser for condensing high pressure and high temperature gas refrigerant into a liquid, an evaporator system for evaporating the liquid refrigerant to a low pressure gas, an evaporator control valve for controlling the refrigerant flow to the evaporator and an engine-compressor device (also referred to as the jet compressor) coupled between the evaporator control valve and the evaporator. The liquid refrigerant flow from the condenser to the jet compressor is controlled by a micro-controller circuit. The liquid refrigerant expands in the jet compressor. The expansion process results in converting a portion of the liquid refrigerant to gas. The jet compressor discharges the liquid refrigerant therein to the evaporator wherein it boils to a gas. The gas produced by the expansion process within the compressor and separated from the liquid drives the jet compressor. The gas from the evaporator is discharged into the jet compressor wherein it is compressed to a high pressure by the jet compressor. When it is desired to use mixed refrigerants having different densities (specific gravities) for use in a refrigeration system, means within the jet compressor are provided to separate different density refrigerants and oil mixed with these refrigerants. The different density refrigerants are separated in the jet compressor and supplied to appropriate evaporators in the system.

In each of the above described embodiments, the jet compressor functions as an expander, a separator for different density fluids and as a compressor for compressing low pressure gas from the evaporator(s).

In another embodiment of the refrigeration system of the present invention, the engine of the engine-compressor device is coupled to and driven by the high pressure gas in an enthalpy-expander. The engine drives the compressor, which is coupled to the evaporator for compressing low pressure refrigerant leaving the evaporator.

In all of the embodiments described above, the engine, in addition to being driven by gas, may also be driven by a motor coupled thereto so as to compress the low pressure gas refrigerant leaving the evaporator to the desired high pressure, thereby eliminating the need for the primary compressor.

Examples of more important features of the invention have been summarized above rather broadly in order that the detailed description thereof that follows may be better understood, and in order that the contribution to the art may be better appreciated. There are, of course, many additional

DESCRIPTION OF THE PREFERRED EMBODIMENTS

Figure 1:
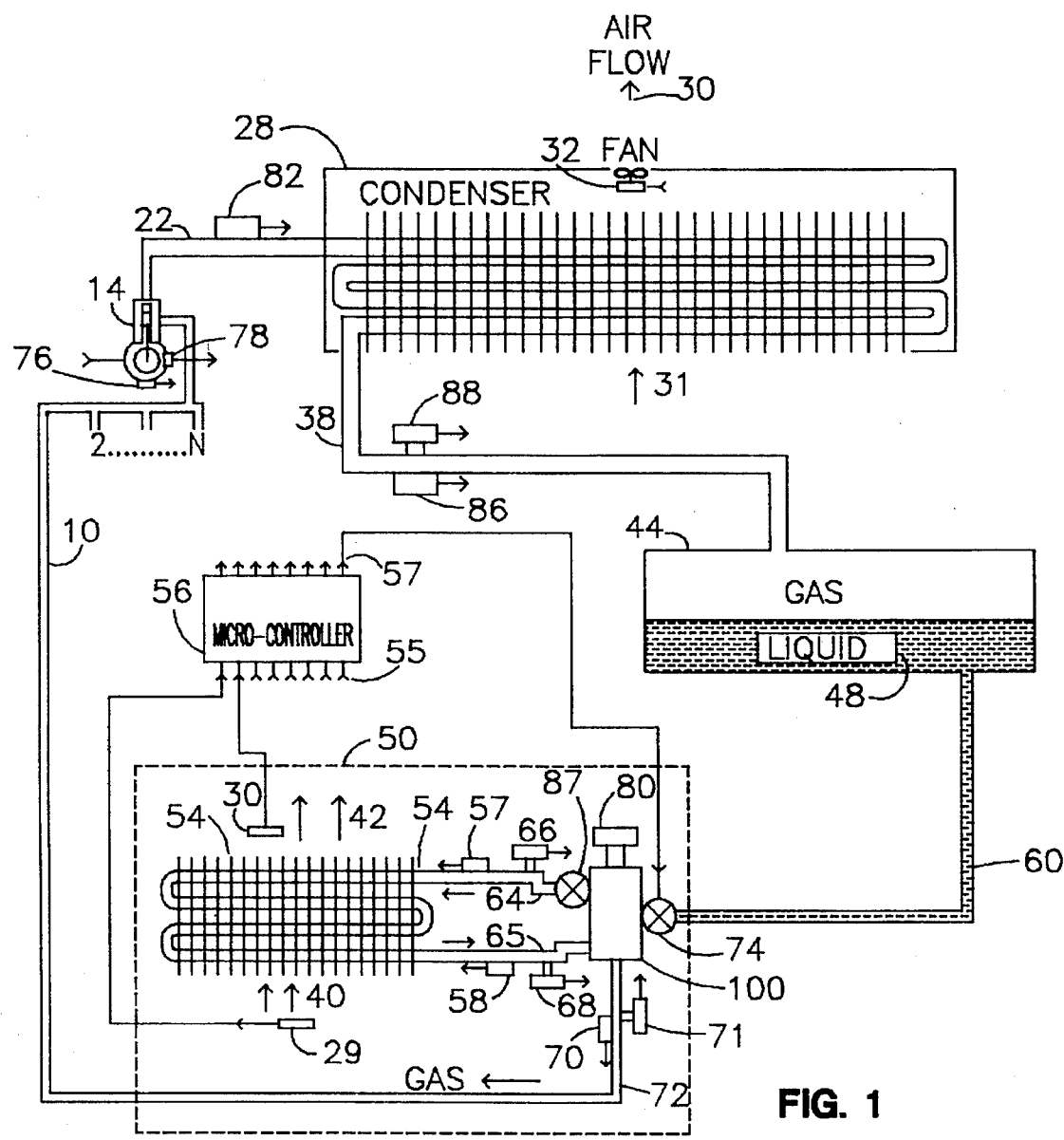
FIG. 1 shows an embodiment of a closed loop vapor cycle refrigeration system according to the present invention.

FIG. 1 shows an embodiment of a closed loop vapor cycle refrigeration system according to the present invention. This refrigeration system includes a primary compressor 14 for compressing a low pressure gas refrigerant to a high pressure and high temperature gas, a condenser 28 for condensing the compressed gas refrigerant to a liquid refrigerant, a fan 32 for circulating air 30 across the condenser 28 for effecting condensation in the condenser 28, a receiver 44 for storing the liquid refrigerant 48, an evaporator systems 50 for evaporating the liquid refrigerant to a low pressure gas, and a jet compressor 100 coupled to the evaporator coil for expanding liquid refrigerant from the receiver before supplying it to the evaporator coil and for compressing the low pressure gas refrigerant leaving the evaporator, an evaporator control valve 74 connected between the receiver 44 and the jet compressor 100, various sensors for providing information about certain desired parameters of the refrigeration system, and a micro-controller circuit 56 for controlling the operation of the refrigeration system in response to the selected system parameters and programmed instructions.

The compressor 14 receives a low pressure gas refrigerant from the jet compressor 100 via a suction tube 10 and compresses this low pressure gas refrigerant to a high pressure and high temperature gas refrigerant. The high pressure gas refrigerant is passed via a line 22 to a condenser 28, wherein it is condensed to a liquid refrigerant by passing air 30 across the condenser 28 by the fan 32. The fan 32 may be of a fixed speed or variable speed type. The air passing across the condenser 28 removes thermal energy from the refrigerant in the condenser and causes it to condense to a liquid refrigerant. The liquid refrigerant from the condenser 28 is discharged via a liquid return line 38 into a receiver or receiver 44. A temperature sensor 82 is placed in the line 22 for providing information (signals) to the micro-controller circuit 56 that is representative of the temperature of the gas entering the condenser 38. Additionally, a temperature sensor 86 and a pressure sensor 88 may be placed in the liquid return line 38 for respectively providing information to the micro-controller circuit that is representative of the temperature and pressure of the refrigerant in the liquid line 38. The liquid refrigerant 48 from the receiver 44 is passed via a line 60 to the evaporator control valve 74, which controls the flow of the refrigerant to the evaporator system 50. The evaporator control valve 74 is preferably a pulse modulated solenoid valve, however, any other suitable control valve may be used.

The evaporator system 50 contains an evaporator coil 54 having an inlet end 64 and an outlet end 65. The jet compressor 100 is connected to both the inlet and outlet ends. The evaporator control valve 74 is connected between the receiver 44 and the jet compressor 100 for controlling the liquid refrigerant flow from the receiver 44 to the jet compressor 100. A secondary control valve 87 may be placed between the jet compressor and the evaporator coil 54 to control flow of the refrigerant from the jet compressor 100 to the evaporator coil 54. A temperature sensor 29 is placed in the evaporator system 50, which provides to a micro-controller circuit 56 electrical signals that are representative of the temperature of the air 40 returning to the evaporator coil 54 (the return air temperature). Similarly, temperature sensor 30 provides information representative of the temperature of the air 42 leaving the evaporator coil 54 (the discharge air temperature). Temperature sensors 57 and 58 respectively provide information representative of the temperature of the refrigerant entering and leaving the evaporator coil 54. Additionally, pressure sensors 66 and 68 are respectively connected to the inlet end and outlet end of the evaporator coil 54 for providing signals to the micro-controller circuit 56 that are representative of the pressures at the inlet and outlet ends. A temperature sensor 70 and a pressure sensor 71 may be installed in line 72 at the jet compressor output for respectively providing information about the temperature and pressure of the gas refrigerant leaving the jet compressor 100. The structure and operation of the jet compressor 100 and the control of refrigerant flow through the evaporator control valve by the micro-controller circuit 56 will be described in more detail later.

Additional sensors, such as sensor 76 and 78, may be placed in the compressor 14 to respectively determine the temperature of the compressor crankcase and the temperature of the oil in the compressor 14. All sensors are coupled to the micro-controller circuit 56, which as noted above, controls the operation of the refrigeration system.

The micro-controller circuit 56 contains, among other things, a microprocessor, analog to digital converters, comparators and switching circuitry. The micro-controller circuit 56 acquires information from various sensors of the system and in response thereto controls the operation of various system elements, such as the evaporator control valve 74, compressor 14 and fan 32 in accordance with programmed instructions provided to or stored in the micro-controller circuit 56. The micro-controller circuit controls the function of various system elements, including the flow through the evaporator control valve 74, fan 32 and compressor 14. The micro-controller circuit 56 is operatively coupled via input ports 55 to temperature sensors 29, 30, 57, 58, 70, 76, 78, 82 and 86, pressure sensors 66, 68, 71 and 88, the compressor 14, fan 32, evaporator control valve 74, and the secondary control valve 87. The outgoing arrows at the sensors and the inward arrows at the micro-controller circuit 56, indicate that those sensors are operatively coupled to and provide relevant information to the micro-controller circuit 56. Similarly, the outgoing arrows at the micro-controller circuit 56 and inward arrows at system elements, such as the compressor 14, fan 32, evaporator control valve 74 and secondary control valve 87 indicate that the micro-controller circuit 56 is operatively coupled to these elements for controlling the operation of these elements.

The micro-controller circuit 56 receives temperature information from temperature sensors 29, 30, 57, 58, 70, 76, 78, 82 and 86, and pressure information from pressure sensors 66, 68, 71 and 88 and controls the refrigerant flow through the evaporator control valve 74 and the secondary control valve 87. During operation, the micro-controller circuit 56 continually determines the values of system parameters, the operation of the various system elements, and the superheat of the refrigerant leaving the evaporator or at some point near the evaporator outlet. The micro-controller circuit 56 causes the evaporator control valve 74 and the secondary control valve 87 to increase or decrease the refrigerant flow therethrough as a function of selected parameters in accordance with instructions provided to or stored in the micro-controller circuit 56.

During operation, evaporator control valve 74 is selectively opened to control the liquid refrigerant flow to the jet compressor 100. A portion of the liquid refrigerant entering the jet compressor 100 expands into gas within the jet compressor. As desired, the secondary control valve 87 is opened to supply liquid refrigerant from the jet compressor 100 to the evaporator coil 54, wherein it expands to a low pressure gas. The low pressure gas from the evaporator coil 54 is discharged into the jet compressor 100 at the evaporator coil outlet 65. The gas produced in the jet compressor 100 during the expansion process is used to drive or operate the jet compressor 100. The jet compressor 100 compresses the gas refrigerant it receives from the evaporator outlet 65 and discharges the compressed gas via line 72 into the suction line 10. FIG. 1 shows one jet compressor 100; however, if desired, more than one jet compressor may be staged (placed in series) to further improve the efficiency of the refrigeration system.

Still referring to FIG. 1, the compressor 14 compresses the refrigerant received from the jet compressor 100 to a high pressure and high temperature gas, which is discharged into the condenser 28. The condenser condenses the high pressure, high temperature gas to a liquid, thereby completing a vapor cycle of the closed loop refrigeration system, which during operation is continuously repeated. The expansion of the liquid refrigerant in the jet compressor 100 removes a certain amount of energy from the liquid refrigerant before discharging it into the evaporator. This expansion process improves the refrigeration efficiency because the energy removed by the expansion process in the jet compressor 100 would otherwise have to be removed in the evaporator. Additional efficiency improvement is obtained because the gas produced in the jet compressor 100 due to the expansion of the liquid refrigerant itself drives the jet compressor to compress the low pressure gas refrigerant from the evaporator to the main compressor 14.

The compression provided by the jet compressor 100 forms the first compression stage in the refrigeration system, thereby enabling the use of a lower compression ratio primary compressor 14. Evaporators 50 is typically located a substantial distance away from the main compressor 14, thus, requiring a long suction line 10. In such applications, it is common to insulate the suction line 10. The use of the jet compressor as a compressor to provide the first compression stage allows the use of a smaller diameter suction tube 10. Additionally, this first compression stage raises the refrigerant temperature at point 72 allowing the use of a non-insulated suction line 10. The use of a non-insulated smaller diameter tube can result in savings, especially in refrigeration systems where the evaporator is placed at a great distance away from the primary compressor 14.

In the refrigeration system of FIG. 1, the jet compressor 100 in addition to being driven by the high pressure gas may also be driven by a motor 80 coupled thereto. The motor 80 provides any additional power be needed to compress the gas from the evaporator to a high pressure level at which the compressed gas may be directly passed to the condenser, thereby eliminating the need for the primary compressor 14.

The structure and operation of the jet compressor 100 will now be described by referring to FIG. 2 and FIG. 3. Referring to FIG. 3, the jet compressor 100 contains a jet driven impeller 112 (referred to hereafter simply as the jet impeller) for compressing a low pressure gas refrigerant to an intermediate pressure gas or a high pressure gas (as desired), an expander 114 coupled to the jet impeller 112 and adapted to be rotated with the jet impeller 112. The expander 114 (a) receives high pressure liquid refrigerant, (b) expands a portion of the high pressure liquid refrigerant into a gas within the expander 114, and (c) separates the liquid and gas present in the expander, and (d) contains means coupled to the jet impeller 112 for supplying gas from the expander to the jet impeller 112 for driving or operating the jet impeller 112.

Figure 2:
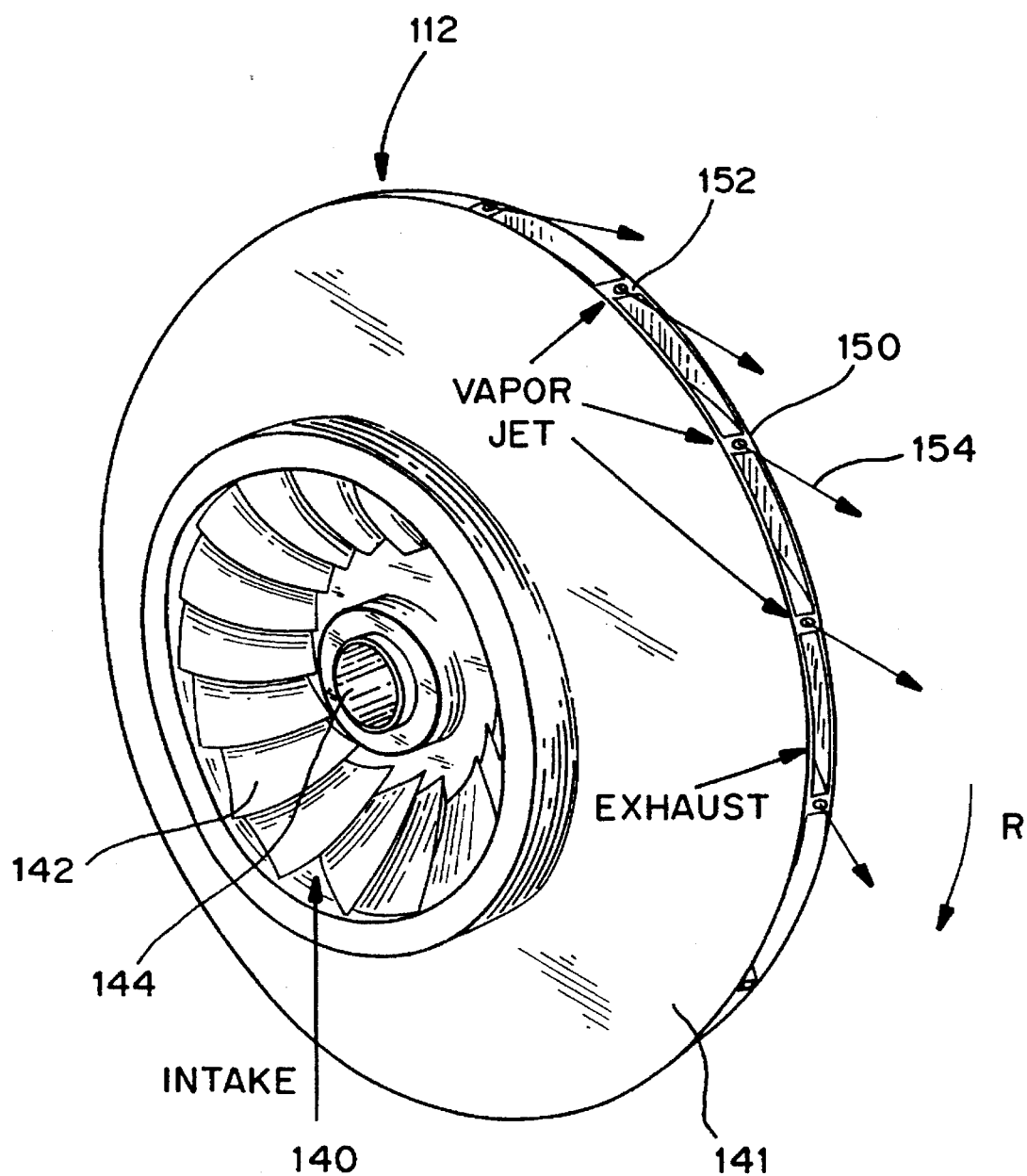
FIG. 2 shows an isometric view of an impeller for use in the jet compressor of 2.
Figure 3:
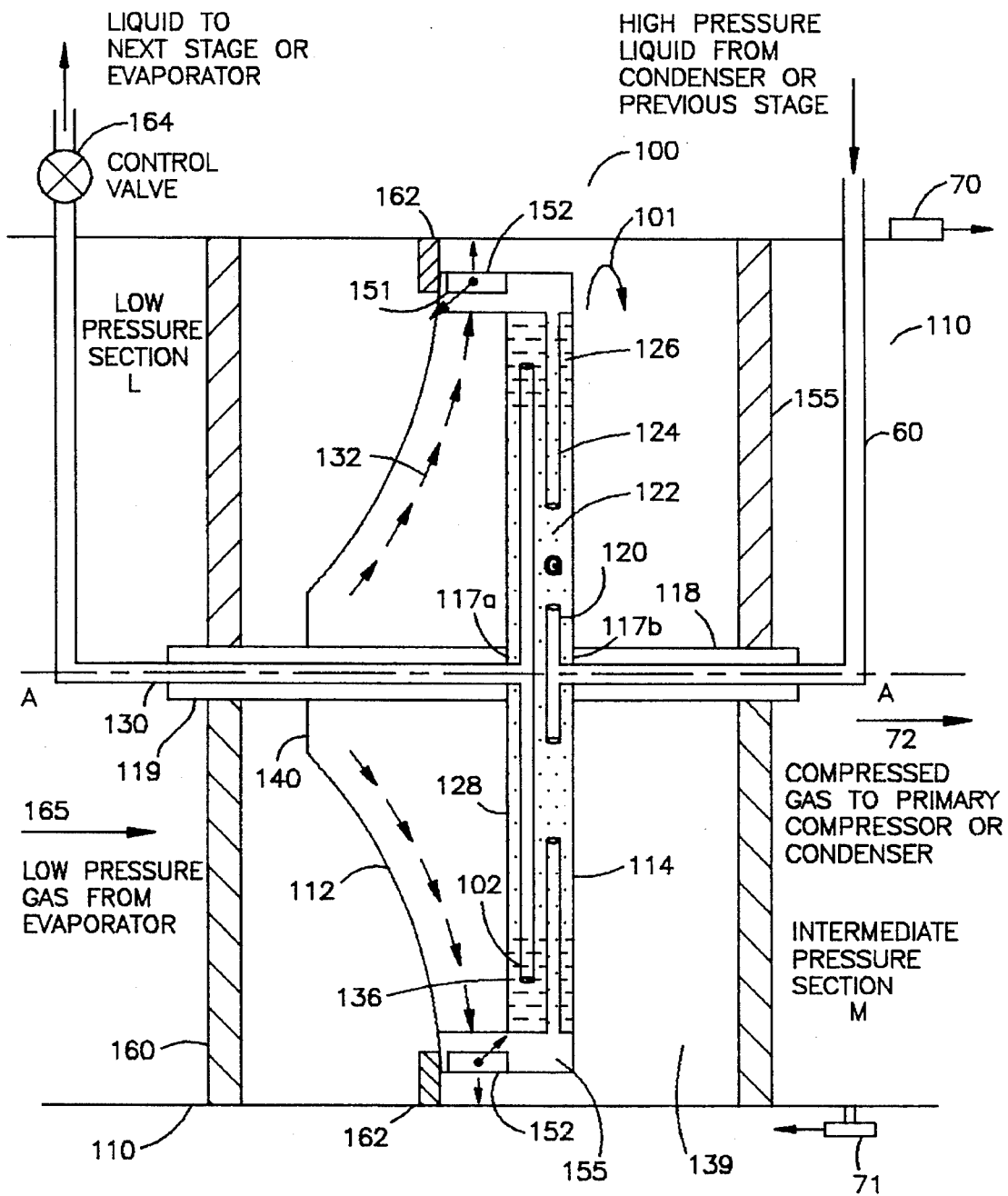
FIG. 3 is a schematic elevation view of the jet compressor according to the present invention.

FIG. 2 shows an isometric view of an embodiment of the jet impeller 112 for use in the jet compressor 100. It is considered helpful to first describe the structure and operation of the jet impeller 112 before describing the structure and operation of the jet compressor 100.

The jet impeller 112 is generally a circular structure having a body 141 which contains an intake section 140 on its one side. A set of impeller blades 142 are placed around a hollow shaft 144. Each impeller blade terminates at an end 151 about the outer periphery of the body 141. When the jet impeller 112 rotates in the direction shown by arrow R, the impeller blades impel any fluid present at the intake 140 and discharge that fluid in the direction shown by arrow 154 in the exhaust side 150. A separate jet 152 for discharging high pressure gas therefrom is placed near the end of each blade 151. Each jet 152 receives high pressure gas from the expander 114 and discharges it into the discharge section 150. The discharge of the high pressure gas from the jet provides motive force to the compressor causing the compressor to rotate about the axis of the shaft 144.

Now referring to FIG. 3, the expander 114 contains a chamber 122 that is connected to a hollow shaft 118 at one side and a similar shaft 119 on the other side. Thus, the expander is in the form of a hollow disc having a circular shaft 118 extending from its one side and a second circular shaft 119 extending from the other side. A liquid line or path 60 is provided through the shaft 118, which terminates into a liquid dispersion means 120 placed inside the chamber 122. The dispersion means 120 may be circular or may have any other suitable form. A means 128 is placed inside the chamber 122 for transferring liquid from the chamber 122 to a line 130. Gas transfer means 124 are provided from the chamber 122 to each of the jets 152. Seals 117a and 117b seal the chamber 122 from the hollow shafts 118 and 119 respectively.

The shaft 119 is placed inside the hollow shaft 144 of the compressor 112 and extends a certain distance beyond the compressor fluid intake 140. The compressor 112 and expander 114 are coupled in a manner that they will rotate together about their common axis A—A. The shafts 118 and 119 are supported inside the chamber 110 by supports 160 and 161 so that the expander-compressor assembly can freely rotate about the axis A—A. An appropriately placed seal 162 divides the chamber 110 into two pressure sections, a low pressure section L and an intermediate pressure section M.

During operation, high pressure liquid refrigerant from the evaporator control valve 74 is discharged via line 60 into the chamber 122. A portion of the liquid refrigerant in the chamber 122 expands into a high pressure gas G. The gas G from the chamber is supplied via means 124 to the jets 152. The jets 152 discharge the gas into the intermediate pressure section M. As noted earlier, the force of the gas leaving the jets 152 provides a jet action, thereby rotating the jet impeller 112 and the expander 114 about their common axis A—A inside the housing 110.

Low pressure gas leaving the evaporator coil 54 (FIG. 1) is discharged into the low pressure section L of the chamber 110 via intake line 65. The compressor 112 compresses the low pressure gas from section L and passes the compressed gas to the intermediate pressure section M, from where it is discharged to the primary compressor of the refrigeration system.

As the chamber 122 rotates, the centrifugal force causes the liquid refrigerant in the chamber 122 to move outward (away from the center of the chamber). The chamber 122 is sealed from the jet blades 152, except for the means carrying gas to the jet blades 152 and therefore, the liquid refrigerant 126 is forced outward in the chamber 122 due to the centrifugal force. The intake ends 102 of the member 128 are placed in the chamber where liquid 126 will collect. The liquid 126 passes into the member 128 from where it passes to the line 130, which in turn discharges the liquid refrigerant into the evaporator of the refrigeration system.

In some applications, it is desirable to use a mixture of refrigerants having different densities. In such applications, the high pressure liquid mixture in the chamber 122 forms layers inside the chamber 122 defined by their relative densities; the heaviest liquid forms the outermost layer and the lightest liquid forms the innermost layer while the gas G occupies the inner portion of the chamber 122. In such a system, a separate means, like means 128, is provided to remove each liquid from the chamber. The intake end of each such separate means is placed at a location in the chamber 122 so as to remove the desired density liquid through that means. The means 124 and 128 may be molded into the chamber 122 or they may be formed by interconnecting lines or by any other any suitable method.

Typically, a single density refrigerant mixed with an oil is used, as is the case for the refrigeration system shown in FIG. 1. In such applications, one line, such as means 128 may be appropriately placed in the chamber 122 to provide the liquid refrigerant to the evaporator coil 54 while a second means may be used to remove the oil from the liquid which is delivered to the evaporator.

As discussed above with respect to FIG. 1, a motor 87 may be coupled to the jet compressor 100 for compressing low pressure gas from the evaporator to the condenser high pressure. In such cases the structure of the jet impeller 112 may easily be modified so as to discharge the high pressure gas from the jets 152 into the low pressure section L so as to create a pressure differential between the high pressure liquid in line 60 and the chamber 122. The motor 87 may appropriately be coupled to the shaft 118 or shaft 119 to drive the expander-compressor combination for compressing the low pressure gas from the section L to the condenser high pressure, thereby eliminating the need for the primary compressor, such as compressor 14.

The flow of the refrigerant to the evaporator may be controlled as described below. The sensors placed in the system continually provide information to the micro-controller circuit 56 about various systems parameters. The micro-controller circuit 56 also continually monitors the operation of the system elements, such as the compressor 14, control valves 74 and 87, and fan 32. Typically, the micro-controller circuit 56 is programmed to contain any number of design criteria for use to control the operation of the refrigeration system. The flow of the refrigerant through the evaporator control valve is controlled so as to provide desired refrigeration under the current operating conditions. The micro-controller circuit 56 may be programmed to store precalculated values of a number of operating criteria in the form that is commonly known in the art as look-up tables. The micro-controller circuit 56 optimizes the refrigeration system efficiency by measuring various temperatures and pressures, consulting the look-up tables in its memory and controlling the refrigerant flow through the evaporator control valve 74 in a manner that prevents the liquid refrigerant from entering into the jet compressor 100 from the evaporator outlet 65.

Figure 4:
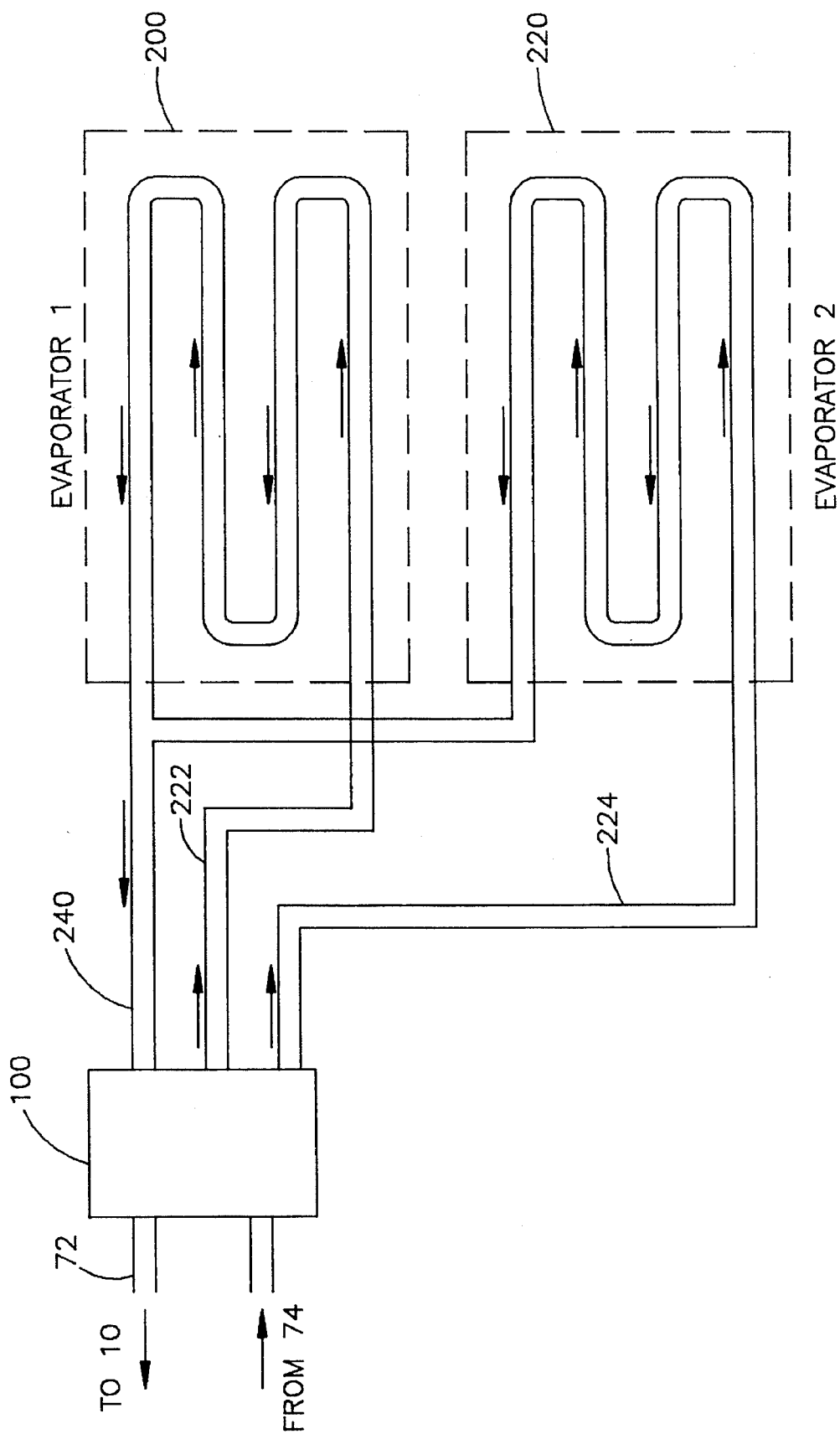
FIG. 4 shows a schematic diagram of a two stage refrigeration system using the jet compressor of FIG. 3.

FIG. 4 shows the use of the jet compressor of FIG. 3 in a refrigeration system having two evaporators and using a mixture of two refrigerants having different densities. The system contains two evaporators 200 and 220. Refrigerant of one density is passed to the evaporator 200 via, line 222 while the second density refrigerant is supplied to the evaporator 220 via line 224. Each evaporator evaporates the liquid refrigerant therein to a low pressure gas. Low pressure gas from both evaporators is returned to the jet compressor 100 via a return line 240. The jet compressor 100 compresses the low pressure gas it receives from the evaporators 200 and 220 and discharges the compressed gas to the primary compressor in a manner similar to as described with respect to FIG. 1. As described earlier with respect to the operation of FIG. 3, more than one jet compressor may be staged in the embodiments of the present invention shown in FIGS. 1 and 3 and described above.

Figure 5:
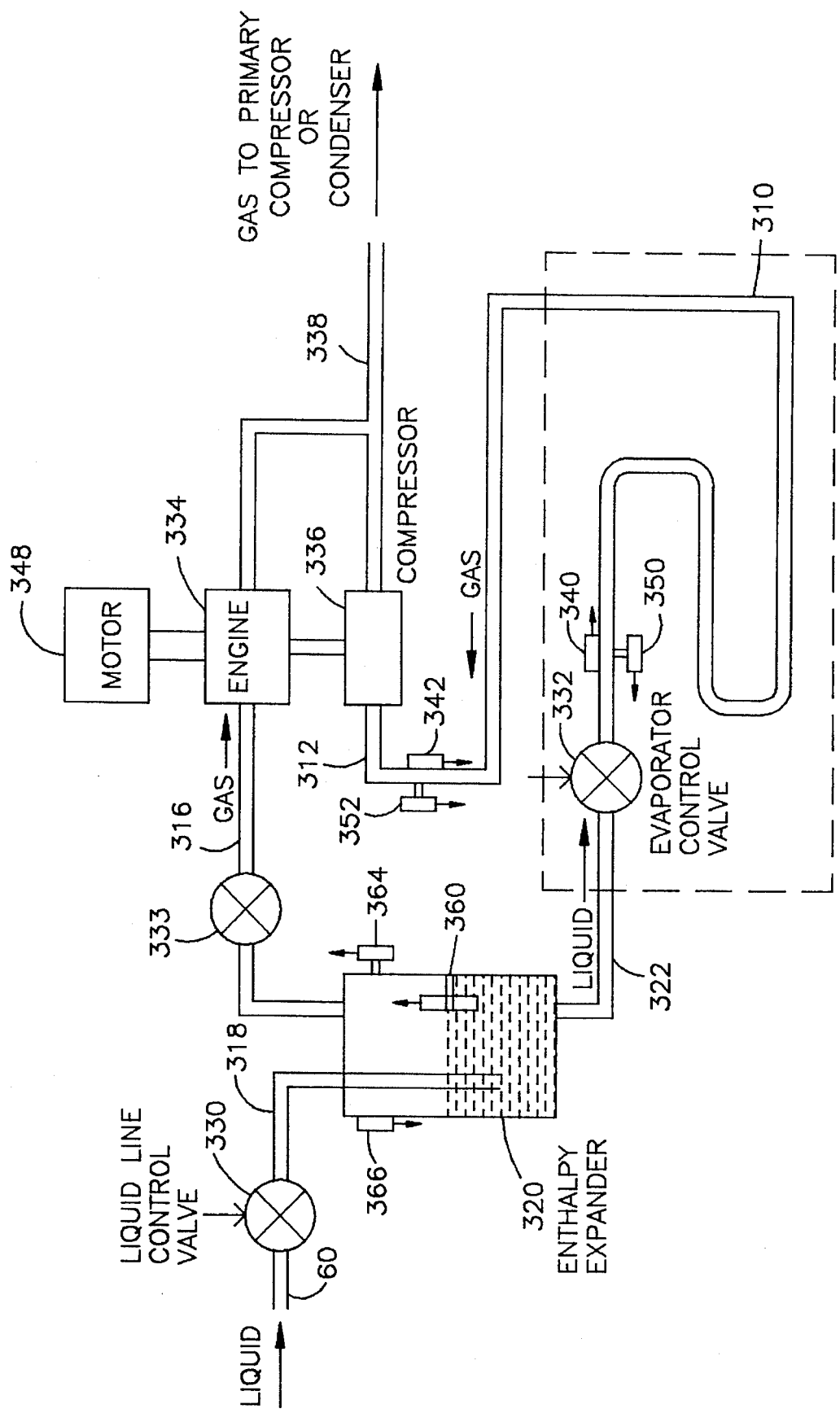
FIG. 5 shows an alternate embodiment of the present invention wherein the engine of an engine-compressor device is coupled to the receiver while the compressor is coupled to the evaporator.

FIG. 5 shows a partial schematic of an alternate embodiment of the refrigeration system of the present invention. In this system, an engine-compressor combination is coupled between an enthalpy expander 310. The high pressure liquid refrigerant from the condenser is passed to the enthalpy expander 320 from the liquid line 60 via a liquid line control valve 330 and line 318. The liquid line control valve 330 is electrically coupled to a micro-controller, such as circuit 56 of FIG. 1, which controls the flow of the refrigerant from the condenser to the receiver 320. The receiver stores the liquid refrigerant, provides sub-cooling and separates gas from liquid. A liquid level sensor 360 is placed in the receiver 320 and coupled to the micro-controller circuit for providing information respecting the level of the liquid refrigerant in the receiver. A temperature sensor 364 and a pressure sensor 366 may be placed in the receiver 360, each coupled to the micro-controller circuit, for respectively providing information about the temperature and pressure in the receiver 360.

The liquid refrigerant from the receiver 320 is passed to an evaporator coil 310 via a liquid line 322. An evaporator control valve 332, electrically coupled to the micro-controller circuit, is placed in the liquid line 322 to control flow of the liquid refrigerant from the receiver 320 to the evaporator coil 310. A temperature sensor 340 and a pressure sensor 350 are placed at the inlet end of the evaporator coil 310 to respectively provide to the micro-controller information about the temperature and pressure at the evaporator coil inlet. Similarly, temperature sensor 342 and a pressure sensor 352 ar placed at the outlet of the evaporator coil 312 to determine the temperature and pressure at the evaporator outlet. An engine 334 is coupled to the receiver 320 via a gas line 316. A compressor 336 is connected to the evaporator outlet 312 for compressing low pressure gas from the evaporator and discharging the compressed gas to a line 338, which may be connected to the primary compressor of the refrigeration system. The engine 334 is coupled to the compressor 336 for driving the compressor.

During operation, the evaporator control valve 332 is closed while the liquid line control valve 330 is opened to fill the enthalpy-expander 320 with the high pressure liquid refrigerant from the condenser to a desired level. The liquid refrigerant in the enthalpy expander expands due to its high temperature and produces a certain amount of gas. The gas from the enthalpy expander is supplied to the engine 334, which drives the engine 334. The flow of the gas from the enthalpy expander 320. The discharge of the gas from the enthalpy expander 320 lowers the pressure in the enthalpy expander 320. The evaporator control valve 332 is then controllably opened to discharge the liquid refrigerant from the enthalpy expander 320 to the evaporator coil 310 until the liquid refrigerant from the enthalpy expander 320 is removed. The liquid refrigerant supplied to the evaporator coil 310 expands to a low pressure gas. The low pressure gas is compressed by the compressor 336, which is coupled to and driven by the engine 334. Gas from the engine 334 and the compressed gas from the evaporator 310 are supplied to a common return line 338, from where it is passed to a primary compressor or the condenser, which completes a cycle that is continuously repeated.

Instead of driving the engine 334 only by the high pressure gas from the enthalpy expander as described above, a motor 348 may be coupled to provide motive force to the engine 334 that is sufficient to compress the low pressure gas from the evaporator 310 to the required high pressure so that it may be passed directly to the condenser, thereby eliminating the need for the primary compressor.

The flow of the liquid refrigerant to the evaporators of the systems shown in FIGS. 4 and 5 may be controlled in a manner similar to the manner described above with respect to the system of FIG. 1.

An advantage of the above described refrigeration systems is that a large majority of the existing refrigeration systems can easily be modified to incorporate the present invention. Additionally, more undesirable (less efficient) the refrigerant is, the more gain in efficiency is obtained by utilizing the present invention. Thus, all refrigerants become more versatile in most temperature applications.

The foregoing descriptions are directed to particular embodiments of the invention for the purpose of illustration and explanation. It will be apparent, however, to one skilled in the an that many modifications and changes to the embodiments set forth above are possible without departing from the scope and the spirit of the invention. It is intended that the following claims be interpreted to embrace all such changes and modifications.

What is claimed is:

1. An apparatus for compressing a fluid comprising:
   (a) a housing;
   (b) a rotatable expansion chamber placed in the housing for expanding therein a portion of a received liquid refrigerant into a gas refrigerant, said chamber separating gas and liquid upon rotation of said chamber; and
   (c) an impeller for receiving and compressing the fluid, said impeller having a plurality of jets, said impeller coupled to the expansion chamber for receiving gas and separately removing liquid from the expansion chamber, said received gas causing said jets to rotate said impeller and the expansion chamber; and
   (d) said chamber communicating with each said jet of said plurality of jets for supplying gas from said chamber to each said jet.

2. A compressor for compressing a fluid utilizing a received high pressure liquid comprising:
   a rotatable expander for expanding a portion of the received high pressure liquid into a gas refrigerant;
   a impeller coupled to said expander for compressing the fluid and having a plurality of jets;
   said expander communicating with each said jet for supplying gas to each such jet to cause said jets to rotate said impeller and expander, the liquid refrigerant and gas refrigerant separating upon the rotation of said expander; and
   passageways in said expander for separately exiting the liquid refrigerant from said expander.

3. A compressor comprising:
   a housing having a chamber;
   an expander and impeller mounted on a shaft rotatably disposed within said chamber;
   said expander and impeller forming first and second pressure sections within said chamber;
   said shaft having a passageway therethrough forming inlet and outlet ends, said inlet end adapted for fluid communication with a source of high pressure liquid and said first pressure section adapted for communication with a source of low pressure gas;
   said expander having a transfer cavity with an inner portion adjacent said shaft and an outer portion adjacent an outer periphery of said expander, said inner portion communicating with said inlet end of said passageway;
   a plurality of jets azimuthally spaced around said outer periphery and each said jet communicating with said second pressure section and said inner portion of said transfer cavity;
   said outlet end of said passageway communicating with said outer portion of said transfer cavity;
   said impeller being housed within said first pressure section and including a plurality of blades forming channels therebetween, said channels extending between adjacent jets and communicating with said second pressure section;
   whereby a high pressure liquid passes through said inlet end of said passageway and into said transfer cavity, a portion of the high pressure liquid expands into a high pressure gas, the high pressure gas passes from said inner portion and through said jets into said second pressure section causing said impeller and expander to rotate within said chamber, the high pressure liquid within said transfer cavity moves outward into said outer portion and flows through said outlet end of said passageway, and the low pressure gas is compressed as it passes through said first pressure section and channels with the compressed gas passing into said second pressure section.

4. The compressor of claim 3 further including an inlet control member controlling the flow of the high pressure gas into said inlet end.

5. The compressor of claim 3 further including an outlet control member controlling the flow of the liquid out of said outlet end.

6. The compressor of claim 3 further including an evaporator having an inlet communicating with said outlet end for receiving the high pressure liquid from said outlet end and an outlet communicating with said first pressure section for supplying low pressure gas to said first pressure section.

7. The compressor of claim 3 further including a condenser communicating with said inlet for supplying high pressure to said inlet end.

8. The compressor of claim 3 further including another compressor communicating with said second pressure section for receiving the compressed gas.

9. The compressor of claim 3 wherein said expander is a hollow disc-like member with said outer periphery being the outer circumference of said disc-like member.

10. The compressor of claim 9 further including an annular chamber around said transfer cavity at said outer circumference, said jets communicating with said annular chamber.

11. The compressor of claim 10 further including a plurality of annular members extending from said annular chamber into said inner portion of said transfer cavity.

12. The compressor of claim 3 further including a plurality of tubular members extending from said outlet end and into said outer portion of said transfer cavity.

13. The compressor of claim 3 wherein said impeller compresses the low pressure gas to an intermediate pressure that has a pressure which is lower than the pressure of the high pressure liquid.

14. The compressor of claim 3 wherein the high pressure liquid includes a mixture of refrigerants having different densities whereby layers of the different refrigerants are formed with said transfer cavity defined by their relative densities with the heaviest liquid forming the outermost layer and the lightest liquid forming the innermost layer.

15. The compressor of claim 14 further including a plurality of different length tubular members extending from said outlet and into different ones of said layers of different refrigerants.

16. The compressor of claim 3 wherein the high pressure liquid is a mixture of refrigerant and oil whereby layers of the oil and the refrigerant are formed within said transfer cavity.

17. The compressor of claim 3 further including an inlet control valve for controlling the flow of high pressure gas into said inlet end, an outlet control valve for controlling the flow of liquid out of said outlet end, a plurality of temperature and pressure sensors at said inlet end, outlet end, first pressure section and second pressure section, and a microprocessor for receiving signals from said sensors, said microprocessor adjusting said valves in response to said signals to control the flow at said inlet and outlet ends.

18. The compressor of claim 17 wherein said inlet control valve is a pulse modulated solenoid valve.

19. The compressor of claim 3 further including first and second evaporators having first and second refrigerants with different densities, a primary compressor, and a condenser, said first and second evaporators having a common outlet communicating with said first pressure section, said primary compressor communicating with said second pressure section, and said condenser receiving high pressure gas from said primary compressor and providing said inlet end with high pressure liquid, said transfer cavity separating said first and second refrigerants by their densities and said outlet end providing said inlet of said first and second evaporators with first and second refrigerants, respectively.

20. A method of utilizing a high pressure liquid to compress a low pressure gas, comprising the steps of:

expanding a portion of the high pressure liquid to a high pressure gas;

separating the high pressure gas from the high pressure liquid;

passing the high pressure gas through jets on an impeller;

rotating the impeller as the high pressure gas passes through the jets;

flowing the low pressure gas into the rotating impeller; and compressing the low pressure gas in the impeller.

21. The method of claim 20 further including the step of passing the remaining high pressure liquid to an evaporator.

22. The method of claim 20 further including the step of passing the compressed gas to another compressor for further compression.

* * * * *